(12) United States Patent
Tegland

(10) Patent No.: US 6,536,731 B1
(45) Date of Patent: Mar. 25, 2003

(54) STRUCTURE FOR MOUNTING RIGGING EQUIPMENT

(76) Inventor: Skyler M. Tegland, 23711 Mariner Dr., #40, Dana Point, CA (US) 92629

( * ) Notice: Subject to any disclaimer, the term of this patent is extended or adjusted under 35 U.S.C. 154(b) by 0 days.

(21) Appl. No.: 09/775,270

(22) Filed: Feb. 1, 2001

Related U.S. Application Data
(60) Provisional application No. 60/179,513, filed on Feb. 1, 2000.

(51) Int. Cl.[7] .................................................. A47F 5/08
(52) U.S. Cl. ..................... 248/309.2; 248/304; 248/307; 248/308; 211/100
(58) Field of Search ........................... 248/309.2, 187.1, 248/183.2, 183.3, 185.1, 307, 308; 211/85.3, 100; 403/83, 348, 349

(56) References Cited

U.S. PATENT DOCUMENTS

| | | | | |
|---|---|---|---|---|
| 1,871,797 A | * | 8/1932 | Kennedy et al. ............ 248/308 |
| 3,675,785 A | * | 7/1972 | Martin ..................... 211/119.1 |
| 3,941,250 A | * | 3/1976 | Ott ............................... 211/1.3 |
| 4,051,953 A | * | 10/1977 | Shoaf ......................... 211/100 |
| 4,146,204 A | * | 3/1979 | Thalenfeld ............. 248/220.41 |
| 5,064,061 A | * | 11/1991 | Moxley ...................... 206/289 |
| 5,352,006 A | * | 10/1994 | Ocuin ........................ 206/289 |
| 5,520,141 A | * | 5/1996 | Lutz ........................... 116/173 |
| 5,533,600 A | * | 7/1996 | Van Himbeeck et al. ... 190/115 |
| 5,950,845 A | * | 9/1999 | Harris ........................ 211/100 |

\* cited by examiner

Primary Examiner—Korie Chan
Assistant Examiner—Ingrid Weinhold

(57) ABSTRACT

A mounting device for motion picture production equipment. The mounting device includes a substantially planar base, a mounting terminus having a longitudinal axis and means for securing the mounting terminus to the base. The mounting terminus is rotatable with respect to the planar base so that the angle established between the longitudinal axis and planar base is variable.

5 Claims, 8 Drawing Sheets

STRUCTURE FOR MOUNTING RIGGING EQUIPMENT

RELATED APPLICATIONS

This invention claims priority to U.S. provisional patent application Ser. no. 60/179,513 filed Feb. 1, 2000, which is incorporated herein by reference, in its entirety:

BACKGROUND OF THE INVENTION

1. Field of the Invention

This invention relates generally to the field of photography, and specifically to a mount for motion picture lighting and rigging equipment.

2. Description of the Related Art and Terminology

For the purpose of this discussion, certain terminology specific to the motion picture industry will be defined and referred to throughout. Standard within the industry are two types of coupling that allow lighting, camera and special effects equipment to interchangeably fit a variety of support media. These two types are distinguished by the diameter of the male end of each coupling. The smaller of the two is of ⅝" diameter and is referred to adjectivally as "baby". Thus, a ⅝" diameter pin is a "baby pin". The corresponding adjective that describes the larger termini is "junior," indicating a diameter of 1-⅛". Thus, a "junior receiver" is a socket that accepts a 1-⅛" diameter "junior pin".

A "nail-on plate" is a steel plate provided with either a baby pin or a junior receiver. Holes in the base of the plate provide means for attaching the plate to set walls and the like through the use of nails or, more commonly, self-tapping screws. A "process trailer" is an automotive trailer used in motion picture production to simulate driving. The process trailer is towed behind a camera truck. A "pancake" is a plywood flat, 1"×10"×20". These are used as platforms to elevate set furniture and properties. The term "skid plate" describes a pancake to which a nail-on plate has been affixed. These are used to support equipment that is low to the ground——too low to allow the use of a conventional stand. A "taco cart" is a cart designed specifically to house and carry motion picture lighting equipment. Special provision is made within the cart for securing a variety of apparatus, including pancakes. A "luminaire" is a photographic lighting unit.

In order that this vocabulary be more easily understood, examples of the above referenced support media and the two types of coupling are illustrated in FIGS. 12–15. Further examples may be found in any manufacturer's catalog of motion picture equipment. Additionally, the terms "mounting terminus", "terminus" or "pin" as employed herein shall designate a baby pin, junior pin, baby receiver, junior receiver, or other such device that provides means for coupling equipment to a support apparatus. To reduce verbiage, the position of a mounting terminus at substantially a right angle to the base, as depicted in FIG. 1, shall hereafter be designated the "perpendicular position". The position of a mounting terminus lying substantially parallel to the base and contained within the plane defined by the vertical dimensions of the base shall be characterized as the "planar position". The planar position is depicted in FIG. 4.

Of particular significance to the present invention is the nail-on plate, the use of which is illustrated in FIGS. 12 and 13. Initially, the nail-on plate was designed to attach to set walls and to support lights in locations where a stand would be found inconvenient. If, for example, a light were required in a location where the supporting stand would be seen in the shot, then a nail-on plate would be specified. The nail-on plate is now found useful for supporting equipment other than lighting units. Light-modifying scrims, flags, gel frames, reflectors and special effects equipment all are commonly supported by a nail-on plate.

Serviceable as the nail-on plate appears, it suffers from several drawbacks which significantly limit its usefulness. These limitations primarily result from the fixed projection of the mounting terminus perpendicular to the plate. An examination of the most common uses of the nail-on plate reveals how this projection results in a restricted utility.

The principal use of the nail-on plate is to support a light on a set wall. When so attached, the pin protrudes approximately six inches into the space of the set, constituting a significant safety hazard to the actors and workmen. When a light is fitted to the plate, the pin is covered and the hazard is negated. Often the light is removed, however, to be used on another set up, while the nail-on plate is left as a "place marker". This action facilitates the re-creation of the lighting set up at a later time. In the dim light of the set perimeter, these jutting pins are difficult to see, and have been responsible for many cuts and bruises. The hazard is extreme, however, when a nail-on plate is mounted at eye level or in a doorway.

The nail-on plate is frequently attached to a pancake to construct a stand, known commonly as a skid plate, the use of which is illustrated in FIGS. 14 and 15. This stand is used to position lights and other equipment low to the ground. In this case, the projection of the pin prevents the skid plate from being stacked in modular fashion when not in use. The inability to store equipment in an organized fashion represents a serious liability in motion picture production, where all of the equipment must fit on a tightly packed cart to be hauled to the next location. In practice, the skid plates are constructed as needed and disassembled at the end of the day. The process is inefficient and wasteful of valuable manpower and materials.

A further difficulty arises when storing the actual nail-on plates themselves. The plates are stored, along with other equipment, in perforated crates, similar to milk cartons. These crates, in turn, are fitted onto taco carts. The perforations are necessary so that the contents of the container may be determined without removing the crate from the cart. The protrusion of the nail-on plate's pin through one of these perforations can effectively lock the crate into the cart, such that its contents may only be accessed with great difficulty. The plates themselves may prove difficult to remove from the crate for the same reason. The projection of the pin perpendicular to the plate also prevents the organization of the plates within the crate.

When shooting from a process trailer, nail-on plates are used to provide braces which steady lights and camera equipment against the motion of the vehicles. These plates are fastened to the plywood deck of the process trailer, with their pins protruding vertically. Even in a small lighting set up, the deck of the trailer can quickly become a forest of vacant pins, making working conditions difficult and potentially hazardous.

The preceding examples serve to highlight the difficulties that are associated with the use of the nail-on plate. It would therefore be of significant value in the art to provide a device which yielded all the advantages of the nail-on plate, yet obviated the difficulty of storage and the significant safety hazard which result from the fixed projection of the nail-on mounting terminus perpendicular to the base. Such a device would provide a mounting terminus which is moveable and which may be contained within the plane of the base.

One available device illustrated in U.S. Pat. No. 4,200,906, provides a base portion and a mounting terminus for a lighting standard. Similarly, U.S. Pat. Nos. 2,867,301, 5,481,846, 5,568,909 and 5,816,554 all illustrate base portions and rigid mounting termini. Another available device, illustrated in U.S. Pat. No. 4,235,405, combines an attachable base and a mounting terminus which is capable of a plurality of positions. Similarly, U.S. Pat. Nos. 3,152,527, 4,621,786, and 5,173,725, all illustrate camera mounts, and U.S. Pat. Nos. 2,667,317, 2,856,146, and 2,922,609 illustrate relevant apparati. However, none of the art known to the inventor has addressed the shortcomings of the prior art as outlined above.

SUMMARY OF THE INVENTION

The present invention is directed to a mounting device for motion picture production equipment such as a luminaire. The mounting device includes a substantially planar base, a mounting terminus having a longitudinal axis and means for securing the mounting terminus to the base. The mounting terminus is rotatable with respect to the planar base so that the angle established between the longitudinal axis and planar base is variable.

BRIEF DESCRIPTION OF THE DRAWINGS

The present invention will be readily understood by those having skill in the relevant art by the following detailed description in conjunction with the accompanying drawings.

DETAILED DESCRIPTION OF THE INVENTION

Figure 1:
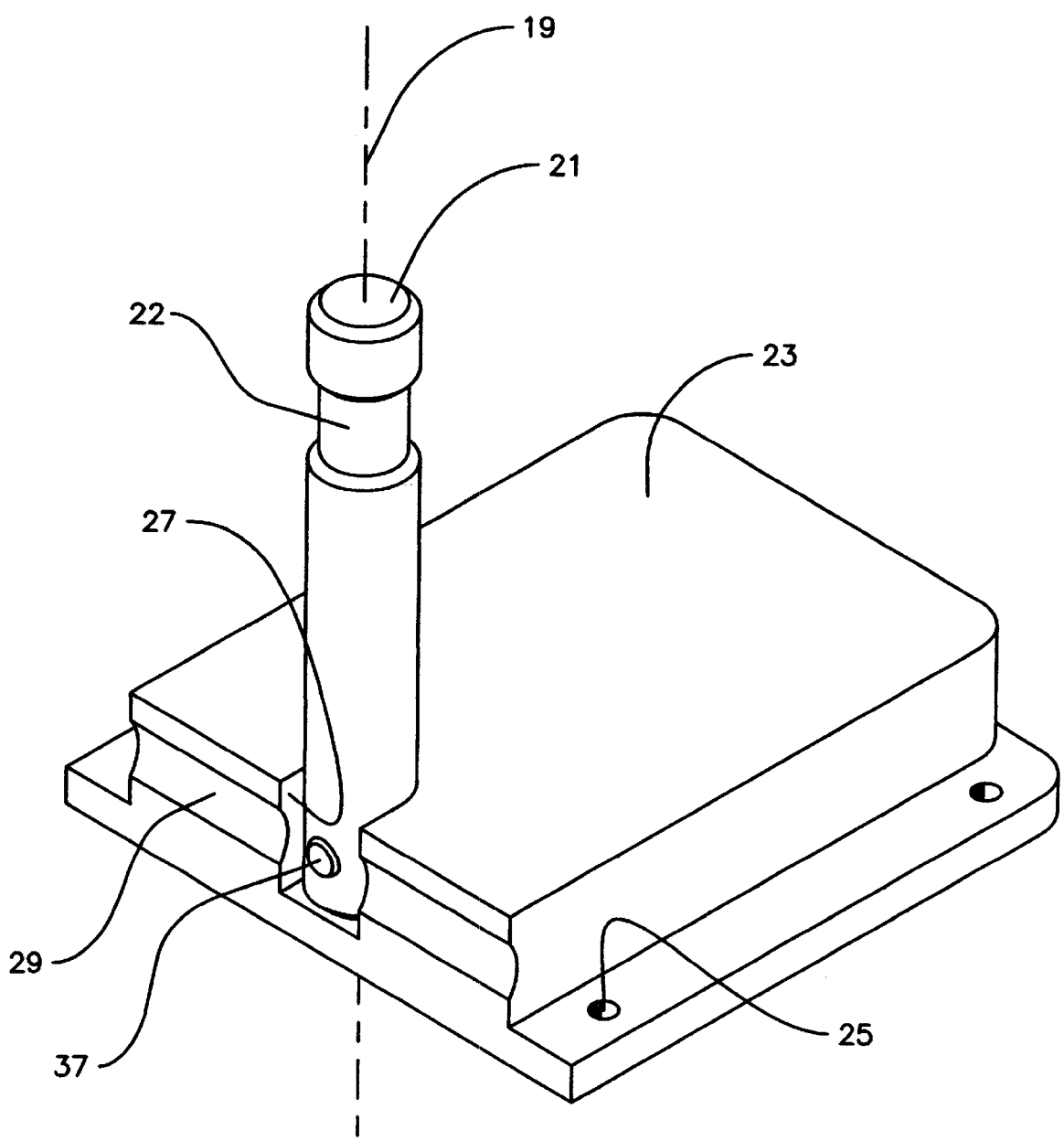
FIG. 1 is a first perspective view of a first embodiment of the present invention.
Figure 2:
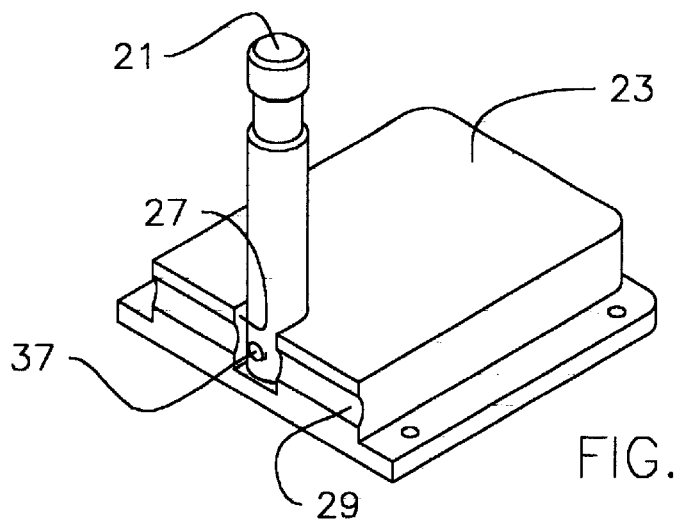
FIG. 2 is a second perspective view of the first embodiment of the present invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by any claims filed in this application or any related non-provisional patent application.

The figures illustrate a preferred embodiment of the present invention. The function of this invention is to provide a mount suitable for motion picture production equipment in which the mounting terminus is readily moveable and may be positioned in either the perpendicular or the planar position, thereby facilitating storage in an organized, modular fashion, and providing a greater measure of safety in the work environment by enabling the user to rotate the mounting terminus flush to the set wall or other surface, thus reducing hazardous projections into the workspace.

As illustrated in FIG. 1, a first embodiment of the present invention is comprised of a base 23 with apertures 25 which provide means for attaching the base 23 to a suitable subsurface. A substantially cylindrical mounting terminus 21 having longitudinal axis 19 and positioning groove 22 is provided for the support of motion picture equipment. The terminus 21 is depicted within the confines of locking slot 27, which prevents rotation of the terminus 21 about the pivot bolt 37. Positioned thusly, the pin would be found useful for supporting motion picture production equipment, or any other apparatus having an aperture compatible with terminus 21.

Figure 4:
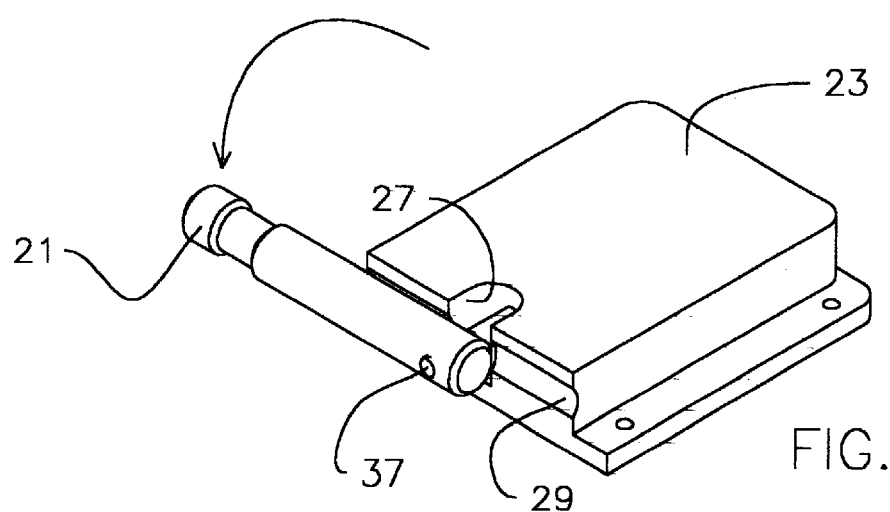

Alternatively, the mounting terminus 21 may be placed in planar position, as depicted in FIG. 4. Such an orientation would be found useful for storage. Further, this would provide a measure of safety in a unit which is attached to a set wall or to a process trailer, reducing the projection of the pin into the workspace.

Figure 3:
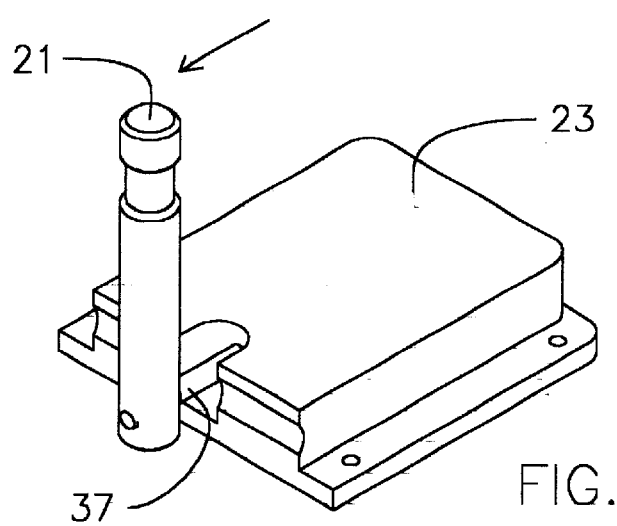
FIGS. 3 and 4 illustrate movement of the mounting terminus in the first embodiment.

To effect the rotation of the mounting terminus 21 from the perpendicular position to the planar position, the user draws the terminus 21 away from the base 23, as depicted in FIG. 3. The mounting terminus 21 is fixed to the end of pivot bolt 37, which is slideably mounted within case 23. Once the terminus 21 has cleared locking slot 27, it may be rotated and positioned to lie within retention groove 29.

Figure 5:
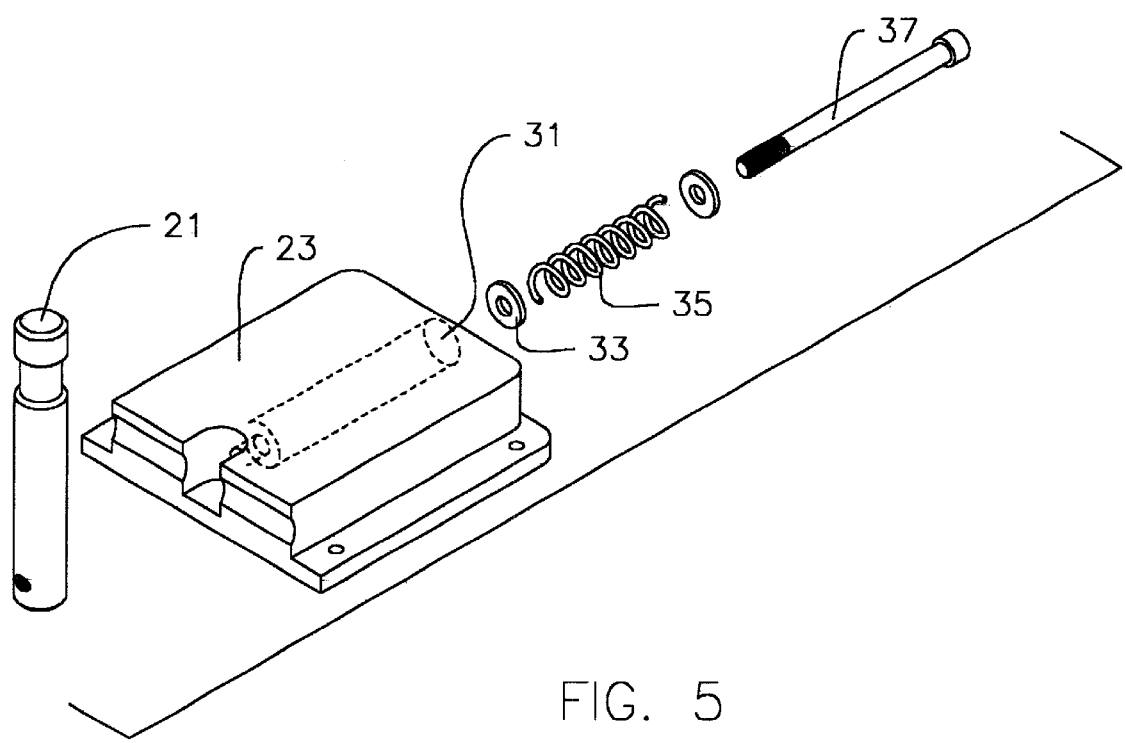
FIG. 5 is an exploded view of the first embodiment of the present invention.

FIG. 5 shows an exploded view of the present invention. A spring 35 housed in aperture 31 provides linear motion that forces the terminus 21 to engage the slot 27 when in the perpendicular position. The spring 35 also provides the retentive force that maintains terminus 21 within the retention groove 29 when in the planar position, as illustrated in FIG. 4.

Figure 6:
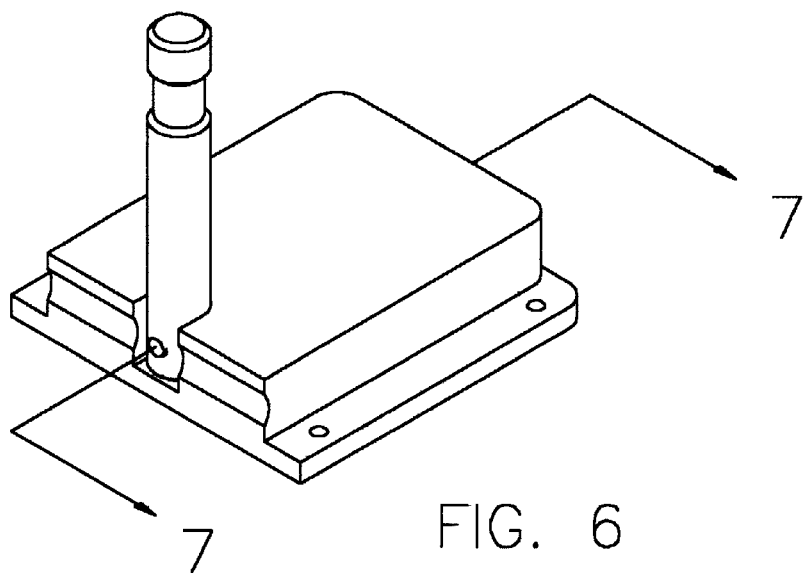
FIG. 6 illustrates the cutting plane used to derive FIG. 7.
Figure 7:
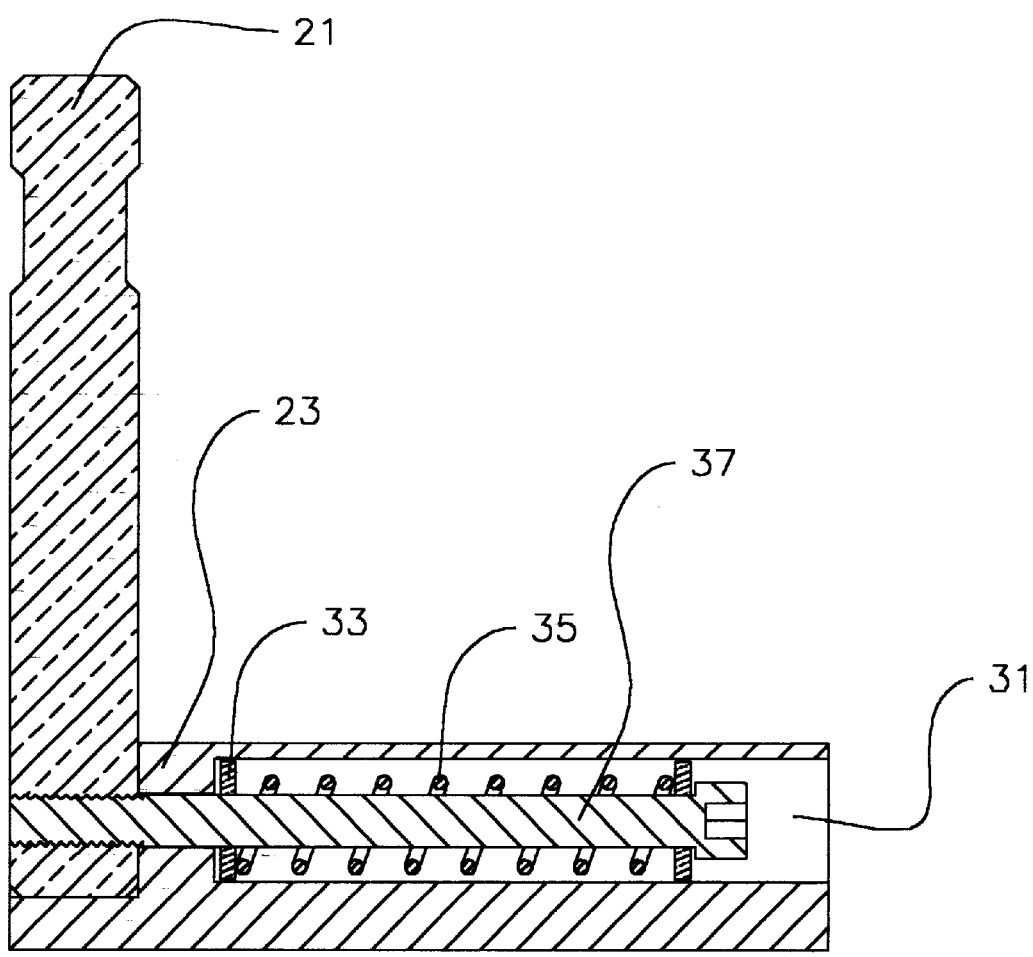
FIG. 7 is a sectional view of the first embodiment of the present invention.

FIG. 6 reveals the cutting plane 7 used to derive FIG. 7, sectional view. FIG. 7 shows the arrangement of the spring 35 and pivot bolt 37 within the base. The spring 35 forces the washer 33 against pivot bolt 37, thus drawing terminus 21 into locking slot 27. Similarly, the terminus 21 may be maintained within the retention groove 29 by action of the spring 35.

Figure 8:
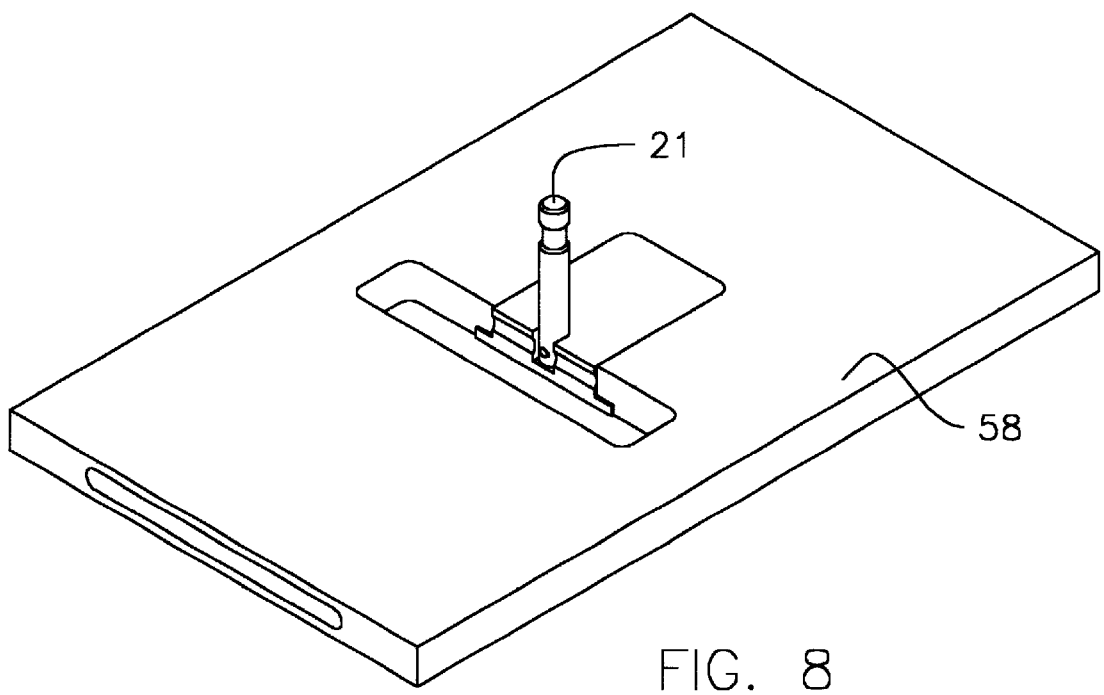
FIGS. 8 and 9 are perspective views of the present invention integrated with a pancake.
Figure 9:
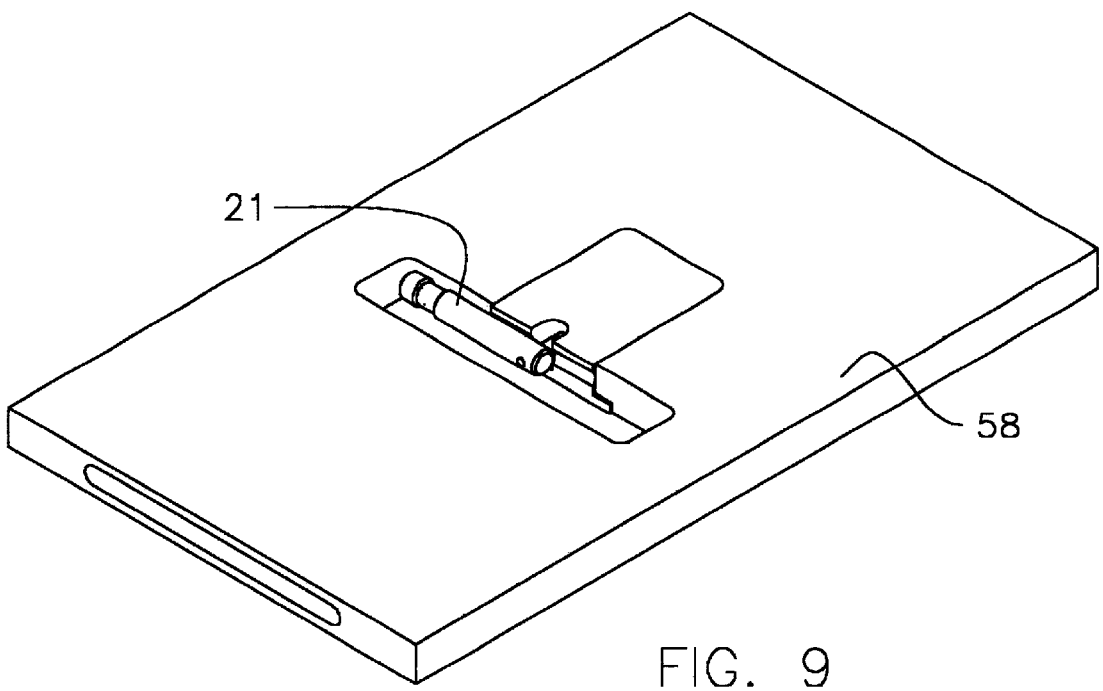
Figures 10, 11:
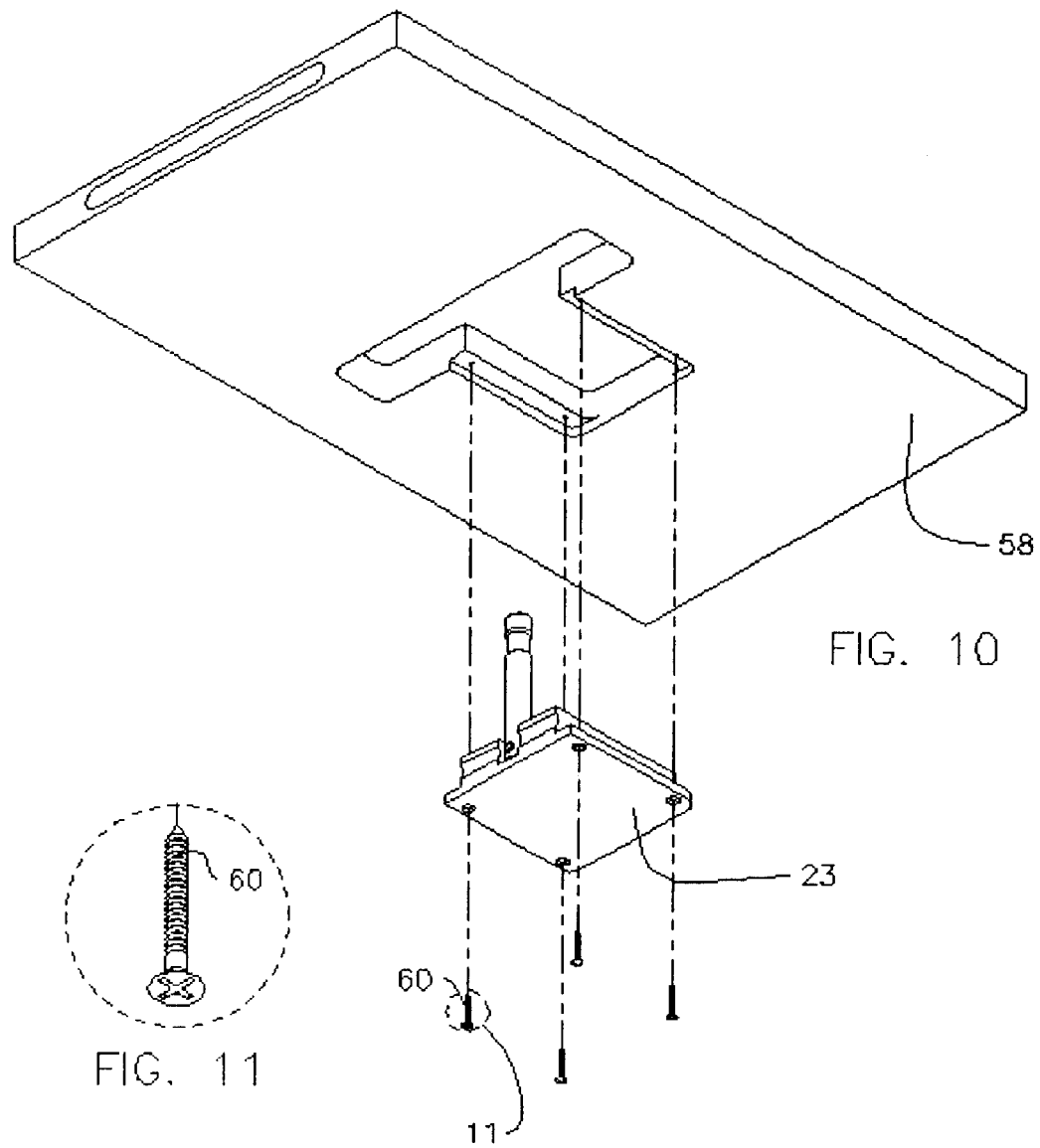
FIG. 10 is an exploded view of the second embodiment.
FIG. 11 is an enlarged view of a portion of FIG. 10.

FIGS. 8 and 9 show how the present invention might be integrated into a pancake 58 to construct a skid plate. The present invention is mounted within a pancake 58 in the manner suggested by the exploded view of FIG. 10 using screws 60. With the pin in a planar position, such units could be stacked in a modular fashion and stored in the space provided in the taco cart. Further, such a construction would not restrict the use of the pancake itself in its usual function as a platform. The utility of a device that is able to perform two functions cannot be overemphasized, especially in consideration of the necessarily limited space available on the storage carts. Further, the conversion of such a device from a pancake to an equipment support requires only the rotation of the pin. In contrast, the process of attaching a baby plate to a pancake requires time and materials, and must be undone at the end of the day so that the equipment will fit on the carts.

Figure 12:
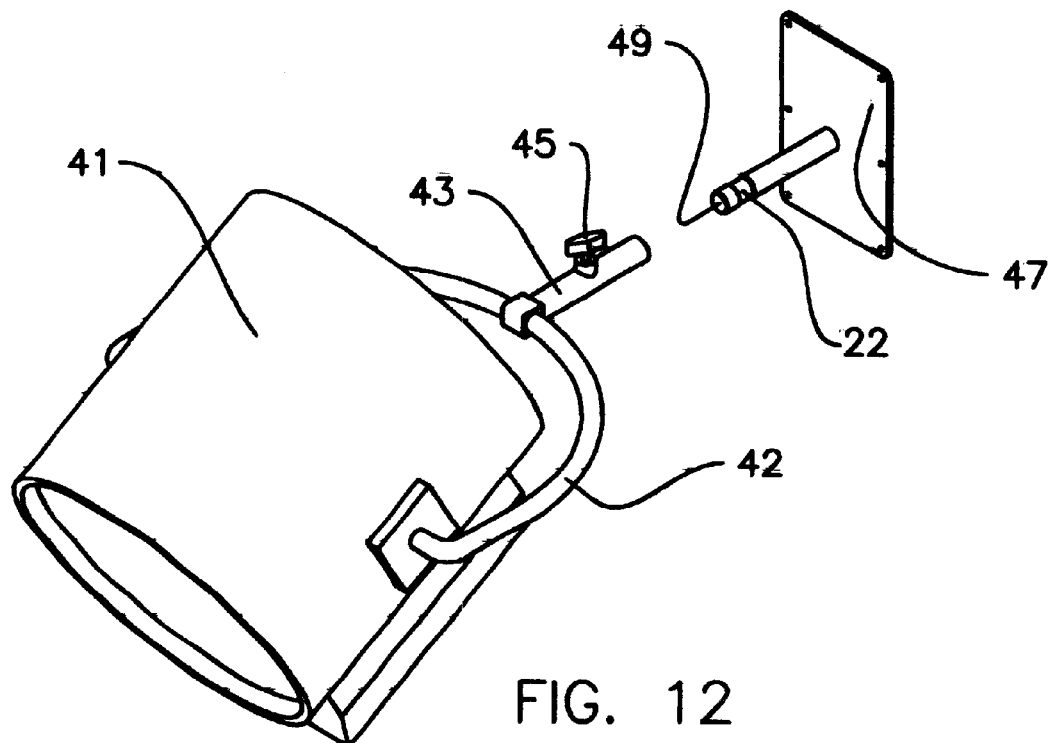
FIG. 12 is a perspective view of a small luminaire and a baby nail-on plate.
Figure 13:
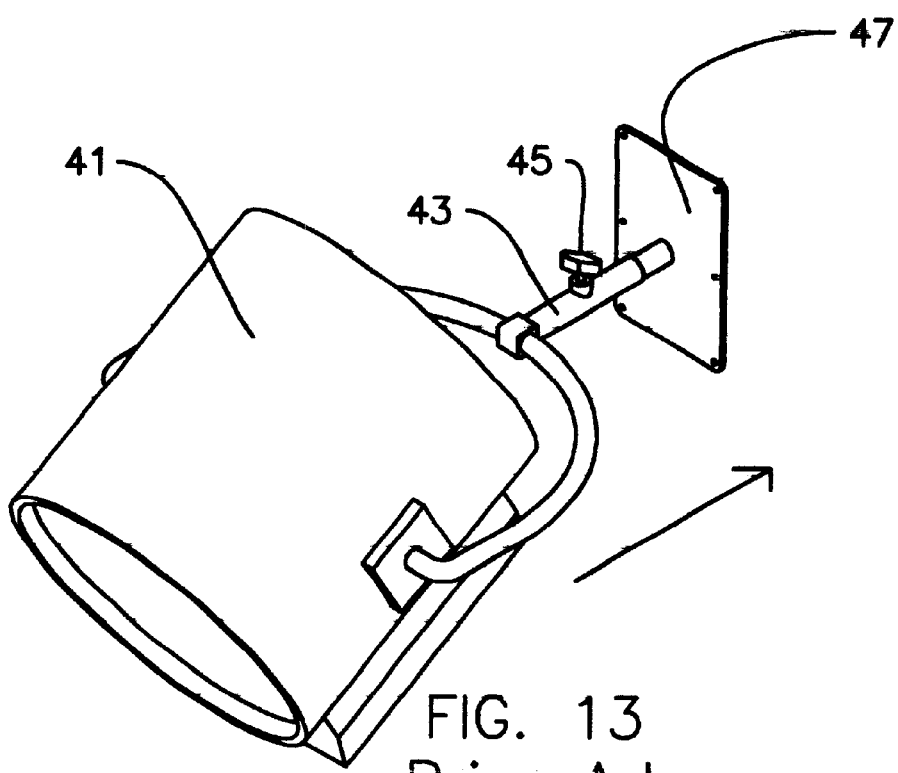
FIG. 13 is a perspective view of a luminaire mounted on a baby nail-on plate

FIGS. 12 and 13 present the use of a baby plate 47 to support a luminaire, as against a set wall. Integral to the bale 42 of the luminaire 41 is a baby receiver 43. The baby receiver 43 is fitted over baby pin 49. Setscrew 45 is then applied within positioning groove 22 to rigidly fasten the luminaire 41 to the baby pin 49.

Figure 14:
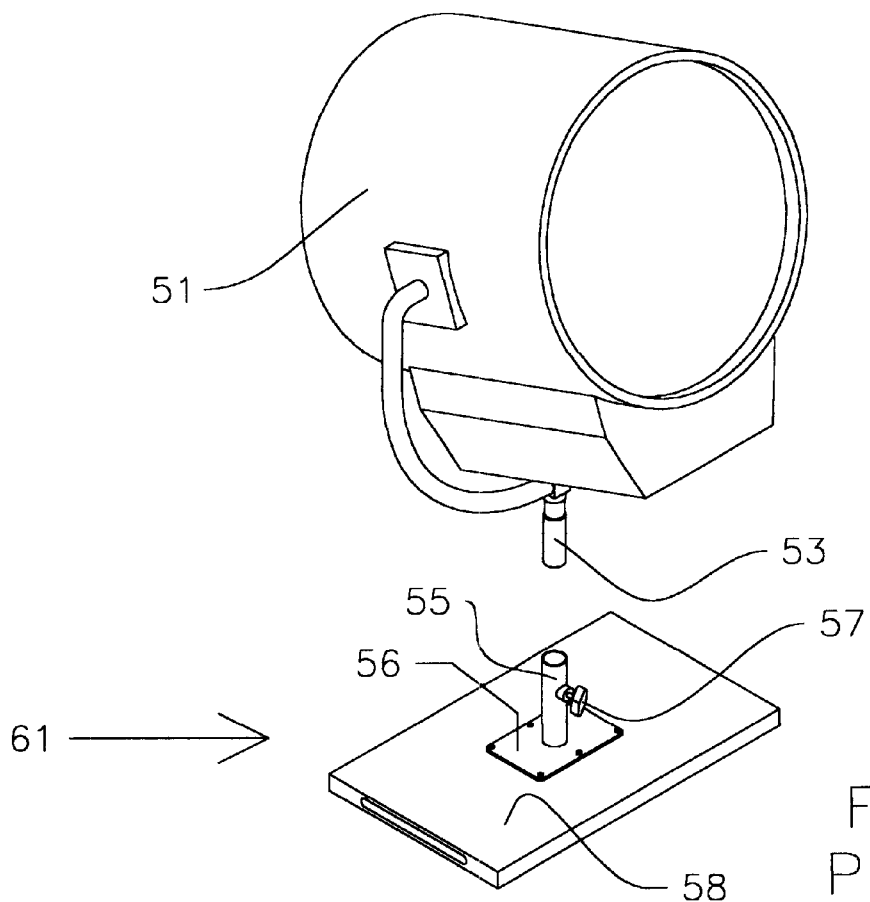
FIG. 14 is a perspective view of a large luminaire and a junior skid plate.
Figure 15:
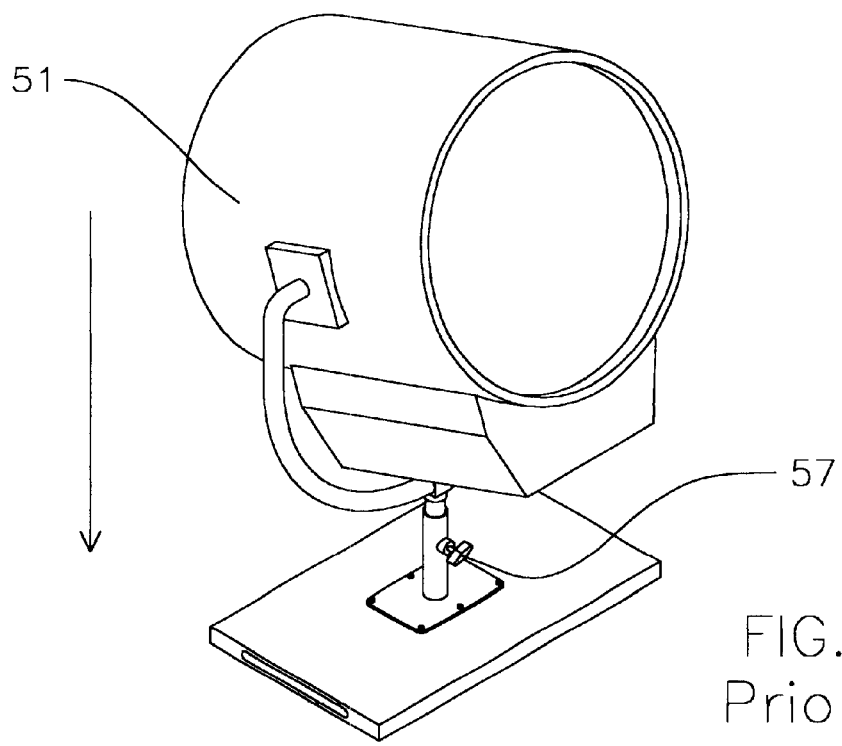
FIG. 15 is a perspective view of a large luminaire mounted on a junior skid plate.

FIGS. 14 and 15 represent the use of a skid plate to support a large luminaire 51. The junior pin 53 in inserted into the junior receiver 55 and locked into position using thumb screw 57. To fix the position of the lamp, a setscrew is applied. Reference numeral 61 refers to both the junior nail-on 56 and the pancake 58, which, in combination, are referred to as a skid plate.

Components of every embodiment of the present inventive system could be manufactured using steel, aluminum alloys, graphite, or reinforced plastics. For durability, in the preferred embodiment the mounting terminus would be made of metal or composite tubing similar to that used in the manufacture of bicycles. The base might be manufactured using steel, aluminum, reinforced plastics, graphite, and or composite material. The variety of the different possibilities of materials would change only the cost and strength of the invention and would not affect the movement of any of the major embodiments herein disclosed.

The present invention therefore provides a novel method and system for mounting rigging equipment. It will be evident that there are numerous embodiments of the apparatus of this invention which are not described above but which are clearly within the scope and spirit of this system. Although the present invention has been shown and described with respect to preferred embodiments, various changes and modifications lie within the spirit and scope of the claimed invention. Thus, the corresponding structures, materials, acts, and equivalents of all means or step plus function elements in the claims in this patent application or any applications claiming priority therefrom are intended to include any structure, material, or acts for performing the functions in combination with other elements as specifically claimed.

What is claimed is:

1. A mounting device for motion picture production and photographic equipment comprising:
   a) a substantially planar base
   b) a mounting terminus
   c) a pivot bolt
   d) a spring
   e) a support platform
   f) said planar base comprising:
      i) a locking slot for positioning said mounting terminus perpendicularly to said planar base
      ii) a retention groove for positioning said mounting terminus parallel to said planar base
      iii) means for attaching said planar base to said support platform
   g) said mounting terminus comprising:
      i) a longitudinal axis
      ii) a substantially straight cylindrical male shaft of predetermined length and of approximately ⅝-inch diameter, said male shaft being configured to fit insertably into and to rotatably support a corresponding female receiver mount of similar diameter
   h) said mounting terminus being rotatable with respect to said planar base such that the angle established between said longitudinal axis and said planar base is variable
   i) said mounting terminus being removable from said locking slot by drawing said mounting terminus from said locking slot in a direction parallel to said planar base
   j) said pivot bolt being provided with means for securing said mounting terminus to said planar base
   k) said spring being provided with means to removably retain said mounting terminus in said locking slot and said retention groove
   l) wherein said planar base and mounting terminus are mountable within said support platform and are sized such that when so mounted neither the planar base or mounting terminus extend outside the dimensions defined by the exterior edges of said support platform when said longitudinal axis of said mounting terminus is parallel to said planar base.

2. A mounting device for motion picture production and photographic equipment comprising:
   a) a substantially planar base wherein said planar base and said mounting terminus are mountable within a support platform and are sized such that when so mounted neither the planar base or the mounting terminus extend outside the dimensions defined by the exterior edges of said support platform when a longitudinal axis of said mounting terminus is parallel to said planar base.
   b) a mounting terminus
   c) said mounting terminus comprising:
      i) a longitudinal axis
      ii) a substantially straight cylindrical male shaft of predetermined length and of approximately ⅝-inch diameter, said male shaft being configured to fit insertably into and to rotatably support a corresponding female receiver mount of similar diameter
      iii) a positioning groove
   d) said mounting terminus being rotatable with respect to said planar base such that the angle established between said longitudinal axis and said planar base is variable
   e) means for securing said mounting terminus to said planar base
   f) whereby motion picture and photographic equipment utilizing standard female receiver mounts may be mountably supported by said mounting terminus and positioned rotatably about said longitudinal axis
   g) whereby said mounting terminus when not in use, may be positioned in parallel to said planar base, facilitating modular storage and promoting safety.

3. The mounting device of claim 2 wherein said means for securing said mounting terminus to said base comprises a pivot bolt.

4. The mounting device of claim 2, wherein said planar base comprises:
   a) a locking slot for accepting said mounting terminus when positioned perpendicularly to said planar base
   b) a retention groove for accepting said mounting terminus when it lays parallel to said planar base
   c) a spring provided with means for securing said mounting terminus to removably retain said mounting terminus in said locking slot and retention groove.

5. The mounting device of claim 2, wherein said planar base is provided with a plurality of apertures for attachment of said planar base to a supporting subsurface.

* * * * *